(12) United States Patent
Saint-Hilaire et al.

(10) Patent No.: US 7,092,360 B2
(45) Date of Patent: Aug. 15, 2006

(54) MONITOR, SYSTEM AND METHOD FOR MONITORING PERFORMANCE OF A SCHEDULER

(75) Inventors: Roxan Saint-Hilaire, Ottawa (CA); Boris Hristov, Kanata (CA)

(73) Assignee: Tropic Networks Inc., Kanata (CA)

( * ) Notice: Subject to any disclaimer, the term of this patent is extended or adjusted under 35 U.S.C. 154(b) by 966 days.

(21) Appl. No.: 10/028,286

(22) Filed: Dec. 28, 2001

(65) Prior Publication Data

US 2003/0125907 A1    Jul. 3, 2003

(51) Int. Cl.
*H04L 12/26* (2006.01)
*H04L 12/56* (2006.01)
*H04F 11/00* (2006.01)

(52) U.S. Cl. ................. 370/241; 370/412; 370/468
(58) Field of Classification Search ............ None
See application file for complete search history.

(56) References Cited

U.S. PATENT DOCUMENTS

| | | | | |
|---|---|---|---|---|
| 5,408,463 A | * | 4/1995 | Merchant et al. | 370/218 |
| 5,559,801 A | * | 9/1996 | Lo | 370/412 |
| 6,018,527 A | * | 1/2000 | Yin et al. | 370/395.41 |
| 6,028,847 A | | 2/2000 | Beanland | 370/252 |
| 6,080,203 A | | 6/2000 | Njinda et al. | 716/4 |
| 6,163,876 A | | 12/2000 | Ashar et al. | 716/5 |
| 6,173,325 B1 | * | 1/2001 | Kukreja | 709/224 |
| 6,449,255 B1 | * | 9/2002 | Waclawsky | 370/236 |
| 6,728,212 B1 | * | 4/2004 | Tancevski | 370/235 |
| 2002/0141425 A1 | * | 10/2002 | Merani et al. | 370/412 |

* cited by examiner

*Primary Examiner*—Chau Nguyen
*Assistant Examiner*—Jordan Hamann
(74) *Attorney, Agent, or Firm*—Victoria Donnelly (57) ABSTRACT

A monitor for monitoring the operation of a scheduler for controlling the departure of data cells is provided, comprising a detector for detecting the state of an internal element of the scheduler during a test, and determining means for determining whether the scheduler is operating as intended based on the detected state of the internal element.

49 Claims, 5 Drawing Sheets

MONITOR, SYSTEM AND METHOD FOR MONITORING PERFORMANCE OF A SCHEDULER

FIELD OF THE INVENTION

The present invention relates to a monitor and method for monitoring the performance of a scheduler, for example, a packet or cell scheduler for use in a communication network.

BACKGROUND OF THE INVENTION

A typical switching element for a communication network has an interface including one or more input ports and a buffer for receiving and temporarily storing incoming data cells, an interface including one or more output ports, for transmitting the incoming data cells onto the next appropriate links of the communication network and a controller for controlling the transfer of data cells between the interfaces. The input buffer may include a number of queues for storing different data cells depending on, for example, the sources of the data cells, the type of data cells and the type of service associated with the data cells. For example, the input buffer may include a number of groups of queues in which different groups store data cells according to different priority of service levels. The controller includes a scheduler, which is responsible for determining the order of queues from which data cells are transferred to the output interface for transmission onto the network. A scheduler including its decision making functionality is implemented in hardware, for example, on an application specific integrated circuit (ASIC).

Various methods have been proposed to test the performance of a packet scheduler, either when implemented as a software model, before synthesis to silicon, or when implemented in hardware.

An example of a system for assessing the performance of a hardware implemented packet scheduler is described in U.S. Pat. No. 6,173,325 (Kukreja), issued on Jan. 9, 2001. In the technique disclosed in this document, a computer system is connected to an Ethernet network and arranged to capture all packets originating at various nodes of the network for a specified period of time. During capture, trigger packets are periodically inserted into the stream of captured packets, and the captured and trigger packets are stored in a file for analysis. The contents of the file are successively transferred to an analyser which includes a dynamic link library (DLL) for measuring the scheduler performance. Analysis is performed on each data packet between successive trigger packets using appropriate software modules. The trigger packets are used to identify those packets transmitted on the network in a particular quantum of time to assist in determining packet rates and bandwidth calculations. The analyser calculates the statistics for the detected network traffic from which the performance of the scheduler is determined.

To assist in the design of integrated circuits, computer aided design and simulation systems have been developed which model aspects of the structure and functionality of the circuit for testing. While basic circuit components such as a basic random access memory can be modelled relatively simply, complex structures, for example, comprising a combination of logic and memory components are more difficult to model. U.S. Pat. No. 6,080,203 (Njinda et al.) issued on Jun. 27, 2000, describes a method of modelling more complex circuitry, such as a register file for an Ethernet network switch, which includes integral memory and logic portions. The register file is modelled by partitioning the logic and memory portions to simplify the logical structure of the register file, so that the now simplified memory model and logic models can be tested separately using existing design tools such as an Automatic Test Pattern Generation (ATPG) system. The accuracy of the model is then verified by actual gate level implementation. If the outputs of the model and actual gate implementation match, the accuracy of the model is verified and the model stored for future use.

In testing the performance of a simulated circuit, a stimulus, for example, a test signal is applied to the input of the model and the response of the model is monitored and verified by monitoring output signals from the device. In the case of simulating a packet scheduler circuit, the performance of the scheduler is tested and verified by generating and supplying test cells to the scheduler and comparing the test cells output from the scheduler with the test cells predicted to be output from the scheduler, based on knowledge and the timing of the test cells supplied to the scheduler and the functional description of the scheduler circuit model, which may include details of the timing of various internal operations. However, such a monitor is difficult and time consuming to implement due to the necessary level of knowledge required for operation of the monitor concerning the timing of internal tasks performed by the scheduler.

SUMMARY OF THE INVENTION

According to one aspect of the present invention, a monitor is provided for monitoring the operation of a scheduler for controlling the departure of data cells from a plurality of queues, in which the monitor includes detection means for detecting the state of at least one element of the scheduler whose state relates to a decision of the scheduler to output a data cell from a queue. The monitor is further adapted to detect at least one of: one or more data cells transmitted to the scheduler, one or more data cells output from the scheduler, and the state of another element of the scheduler. The monitor includes comparison means for comparing the state of the scheduler element with an expected state for that element based on the other detected information, or for comparing the other detected information with expected information based on the state of the scheduler element. Advantageously, by arranging the monitor to monitor at least one internal state of the scheduler, detailed information concerning the internal timing of the scheduler is no longer required to implement the monitor, allowing the monitor to be considerably simplified.

According to the present invention, there is provided a monitor for monitoring the operation of a scheduler for controlling the departure of data cells, comprising detection means for detecting a state of an element of said scheduler, comparing means for comparing the detected state with a predetermined state for said element and for outputting the result of the comparison.

Also, according to the present invention, there is provided a monitor for monitoring the operation of a scheduler for controlling the departure of data cells, comprising detection means for detecting a state of a first element of said scheduler and a parameter relating to the operation of said scheduler, determining means for determining an expected value of said parameter based on the detected state of said first element, and comparison means for comparing the detected parameter with said expected parameter and for outputting the result of the comparison.

According to another aspect of the present invention, there is provided a computer generated model of a scheduler for controlling the departure of the data cells, the scheduler having a plurality of simulated circuit elements and an instruction associated with at least one circuit element causing the status of the element to be transferred externally of the simulated scheduler for detection.

According to yet another aspect of the present invention, there is provided a monitor for monitoring a scheduler for controlling the departure of data cells from a plurality of queues, comprising means for detecting the state of an element of said scheduler at a plurality of different times and comparing the detected states with expected states for that element and for outputting the result of said comparison.

According to the present invention, there is further provided a system for monitoring operation of a scheduler for controlling the departure of data cells from a plurality of queues, comprising a generator for generating test cells and means for placing said test cells in said queues, each test cell containing the identity of the queue in which the cell is placed, and a monitor having means for detecting the state of at least one element of said scheduler whose state depends on which queue is selected by said scheduler for outputting a test cell and means for detecting from each test cell at least one of: input to and output by said scheduler, the identity of the queue in which contained in said test cell, and comparison means adapted to at least one of: compare the detected element status with an expected status for said element based on the detected queue identity and compare the detected queue identity, with an expected queue identity based on the detected status of said element.

According to another aspect of the present invention, there is provided a method of monitoring operation of a scheduler, comprising supplying said scheduler with data, monitoring the state of an element of said scheduler, comparing the monitored state with an expected state for said element, and outputting the result of the comparison.

According to another aspect of the present invention, there is provided a method of monitoring operation of a scheduler for controlling the departure of data cells, comprising supplying said scheduler with data cells, monitoring the status of an element of said scheduler, monitoring the value of a parameter relating to the operation of said scheduler, determining an expected value for said parameter based on the detected state of said element, and comparing the detected value of said parameter with said expected value, and outputting the result of the comparison.

According to the present invention, there is further provided a method of fabricating a scheduler for controlling the departure of data, comprising creating a computer model of a scheduler, generating test cells for testing the performance of said scheduler, monitoring the operation of said computer model including monitoring a state of at least one element of said model, determining whether said model is operating as required based on the monitored state of said at least one element, modifying said model if said model is not operating as required, and synthesizing said scheduler in hardware based on the tested computer generated model.

BRIEF DESCRIPTION OF THE DRAWINGS

Examples of embodiments of the present invention will now be described with reference to the drawings, in which.

DESCRIPTION OF EMBODIMENTS

Figure 1:
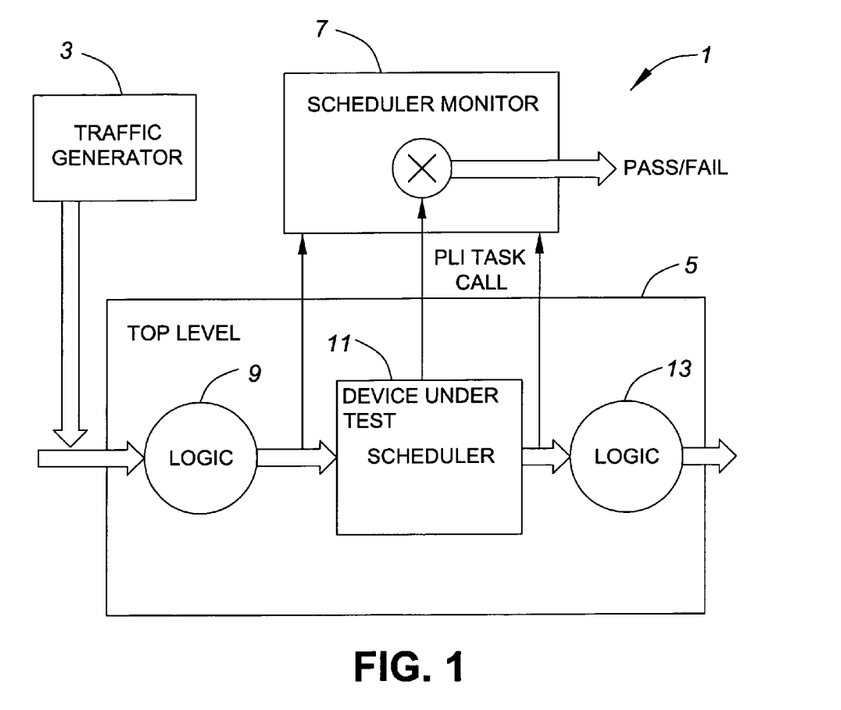
FIG. 1 shows a schematic diagram of an embodiment of the present invention.

FIG. 1 shows a schematic diagram of an apparatus and method for monitoring the performance of a packet scheduler. The scheduler to be monitored may comprise a model described in software or may be implemented in hardware. For example, the scheduler may be simulated in software using Register Transfer Level (RTL) code, and the model may be designed using the Verilog programming language.

Referring to FIG. 1, the monitoring system 1 includes a traffic generator 3 for generating test cells, a device 5 for controlling the throughput of test cells received from the traffic generator 3 and a monitor 7. The device 5 includes input logic 9, a scheduler 11 and output logic 13. The input logic 9 receives test cells from the traffic generator and may be adapted, for example, to determine, from information contained within each test cell, a particular queue of an input buffer in which the test cell should be placed, and pass each test cell into the appropriate queue. The scheduler 11 is responsible for controlling the order in which cells are read out from the input buffer queues and for passing the selected cells to the output logic 13. The output logic 13 serves to package or format the data cells, as necessary, for transmission onto a network according to the appropriate transmission protocol.

The monitor 7 is adapted to receive information relating to the status and operation of one or more elements within the scheduler which may contribute or respond to a decision of the scheduler to read a data cell from a particular input buffer queue at a particular time, and based on this information, the monitor tests the performance of the scheduler element(s). The scheduler monitor may also receive information concerning one or more test cell(s) input to device 5, and check the detected status of the scheduler element(s) with a predicted status for the element(s) based on the incoming test cell(s). Alternatively or additionally, the scheduler monitor may receive information concerning the test cells output from the scheduler, and for example, check that a transmitted test cell is that predicted according to the status of one or more scheduler elements.

Advantageously, the system for monitoring the performance of a scheduler shown in FIG. 1, allows problems with its operation or performance to be identified more rapidly than in prior art systems, which test scheduler performance based only on cell input and cell output. The present embodiment also allows the source of a problem to be identified more rapidly, and in contrast to prior art systems does not need to be cycle accurate, as will be more fully described below.

Figure 2:
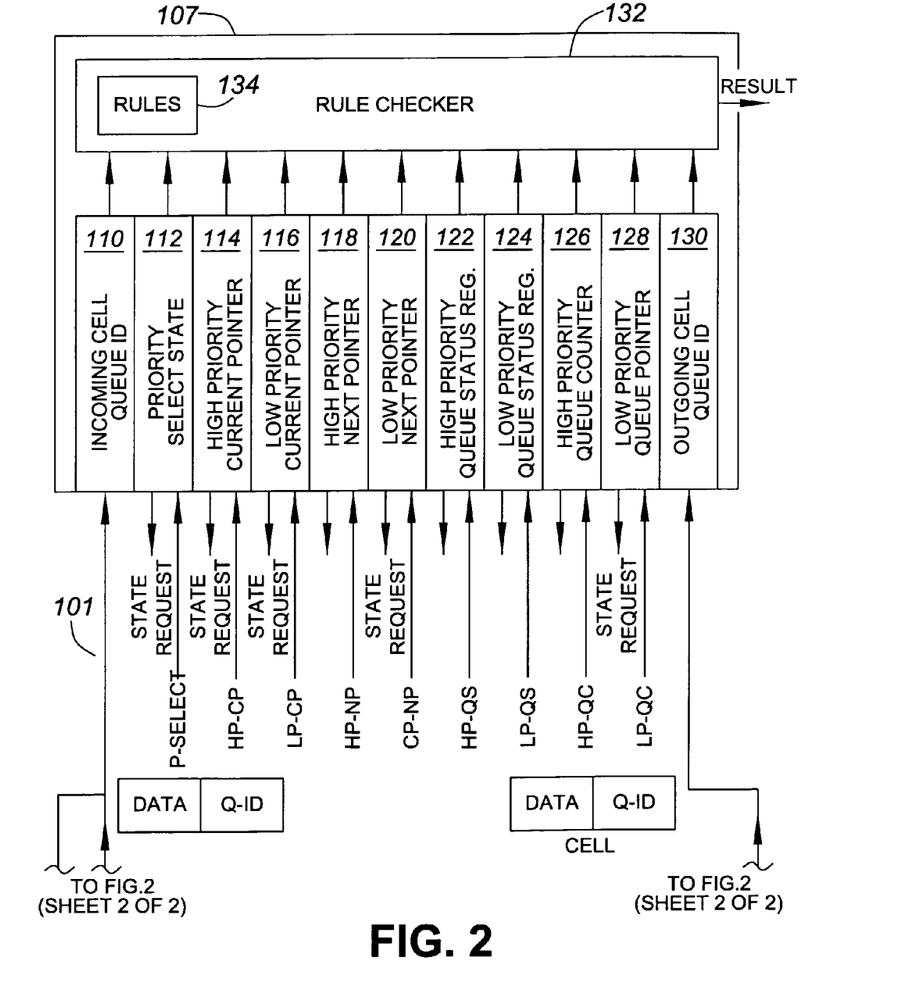
FIG. 2 shows a block diagram of a monitor according to an embodiment of the present invention.

FIG. 2 shows a system for monitoring and testing the performance of a scheduler, according to an embodiment of the present invention, in more detail. Referring to FIG. 2, the system 101 includes a device 105 for controlling the throughput of data cells, and a monitor 107 for monitoring the performance of the device 105. The device 105 includes an input logic circuit 109 and a scheduler 111. The scheduler 111 comprises a cell storage device 115 having first and second storage sections 117, 119, each having a plurality of buffers 121 to 139 (and numbered 0 to 9) and 141 to 159 (also numbered 0 to 9), respectively for temporarily storing incoming data cells. The scheduler 111 has a decision making unit 161 which determines the order of input buffer queues from which data cells are to be output and passed to the output buffer 113, an input buffer controller 163 for sending an arrival notification (AN) to the decision making unit 161 whenever an input buffer receives a new data cell, and for receiving departure requests (DR) from the decision making unit 161, identifying the input buffer from which a data cell is to be output, and in response to the departure request, for outputting a data cell from the specified queue to the output buffer 113. The scheduler 111 further comprises a first queue status register 165 for recording and tracking, for each queue of the first storage section 117, whether a particular queue is empty or occupied, and a second queue status register 167 for recording and tracking, for each queue in the second storage section 119, whether a particular queue is empty or occupied. In this embodiment, each of the first and second queue status registers 165, 167 has a single bit register for each queue where a 0-bit indicates that a queue is empty and a 1-bit indicates that queue is occupied (although the opposite convention could be used). In this embodiment, the scheduler also includes a counter 169 for each queue of the first and second storage sections 117, 119 for recording and tracking the number of cells in a queue. For example, the counter may comprise an eight bit counter capable of recording up to 256 cells in each buffer.

In this embodiment, the scheduler is adapted to control the order of queues from which data cells are read out on the basis of both queue status and a priority weighting. In the present example, the group of input buffers in the first storage section 117 are given a higher priority than the group of input buffers of the second storage section 119. In this embodiment, the degree of priority of the first group of input buffers over the second group and the timing of the selection of the groups are set and governed by a random generator 171 and priority selector 173. In one implementation, the random generator may generate a pseudo-random binary bit stream in which 1's represent the higher priority input buffers and 0's represent the lower priority input buffers. The relative proportion of 1's and 0's generated over time represents the degree of priority assigned to the first group of input buffers over the second group. For example, if it is required to service the first group of input buffers 90 percent of the time and the second group of input buffers 10 percent of the time, a nine to one priority ratio may be implemented by generating a bit stream containing nine ones for every zero.

The selection of input buffers within a particular group 117, 119 may, for example, be implemented by selecting each buffer in turn so that each buffer is selected once per cycle, and is referred to as a "Round Robin" selection process. Preferably, this input buffer selection process is modified to skip queues which are empty so that the scheduler only selects occupied queues for cell read out. This modified selection process is referred to as "Work Conserving Round Robin" (WCRR) selection and in the present embodiment is implemented by the buffer selection unit 175. This unit determines the next buffer in both the high and low priority groups from which data is to be read out based on a sequential order and the empty/occupied status of each buffer.

The scheduler 111 further includes a current pointer (CP) and a next pointer (NP) associated with each of the first and second groups of input buffers. The current pointer for each group identifies the input buffer selected for data readout, and the next pointer for each group identifies the input buffer in each group from which a data cell is to be read following cell readout from the queue selected by the current pointer. In one implementation, the position of both the current pointer and next pointer for each group may be controlled by the buffer selection unit 175. In the example shown in FIG. 2, the buffer selection unit 175 may control the pointers to select each buffer sequentially from buffer number 0 so that the pointers move from left to right as indicated by the arrows. In this example, the current pointer 177 associated with the first group of buffers points to the first occupied buffer, buffer number 1 and the next pointer 179 of the first buffer group points to the next occupied buffer, buffer number 4. Similarly, the current pointer 181 of the second group of buffers points to the first occupied buffer, buffer number 0 and the next pointer 183 of the second group points to the next occupied buffer, buffer number 2. After a cell has been read out from buffer number 1 of the first group, the current pointer will move to the position of the next pointer 179, and the next pointer will move to the next occupied buffer, in this case buffer number 6. Similarly, after a data cell has been read from the first buffer, buffer 0 in the second group, the current pointer will move to the position of the next pointer 183, and the next pointer 183 will move to the next occupied buffer, which in this case is buffer number 4. In one embodiment, at least the current pointer position for each of the high and low priority buffer groups is passed to the decision making unit 161 and used by the unit to determine the buffer from which data is to be read out.

The scheduler monitor 107 is arranged to receive information concerning the status and/or operation of certain elements of the scheduler 111 from which it may determine whether a particular element is functioning properly. In one embodiment, the monitor 107 may be arranged to monitor the status of two scheduler elements where a particular status for one element can be predicted from the status of another element, or vice versa, if the elements are functioning correctly. On the other hand, if an element adopts a status different from the expected status based on the status of the other element, a determination can be made that either one or other of the elements is not functioning correctly. The monitor 107 may include a rule specifying one or more status of a first scheduler element and the expected status for another scheduler element, based on each status of the first element, if the scheduler is operating as intended. The monitor 107 may further include a rule checker which receives information concerning the status of at least two scheduler elements, checks the detected status of the elements with the status rules for the elements and either verifies that the status of the elements agrees with the rule or indicates that the detected status of the elements violates the rule.

The scheduler monitor 107 may be adapted to receive information concerning the status of one or more scheduler elements over a period of time, for example, for a plurality of cell readout decisions, and may compare the status of a scheduler element at one time with the status of that scheduler element at another time and compare the detected status sequence with a sequence expected for that element if functioning properly. In another implementation, the scheduler monitor 107 may receive information concerning the status of one element at one time and information concerning the status of another element at a different time and compare/check the detected status of the two elements with the status expected for the elements if the scheduler is operating correctly. The scheduler may provide a result of the comparison, e.g. an indication of whether the detected and expected status of the elements either match or do not match.

Referring to FIG. 2, the embodiment of the scheduler monitor includes a plurality of modules 110, 112, 114 . . . to 130, adapted to receive information relating to the operation of the scheduler under test, for example, the state of internal elements of the scheduler and parameters relating to the operation of the scheduler, for example, the identity of queues contained in incoming data cells to the input buffer and the identity of queues contained in outgoing cells output by the scheduler. In this embodiment, the monitor includes a module 110 for receiving the input buffer queue identity of incoming cells, a module 112 for receiving the status of the priority selector 173, a module 114 for receiving the state of the high priority current pointer, 117 (i.e. the queue to which the high priority current pointer is pointing) and a module 116 for receiving the status of the low priority current pointer 181 (i.e. the queue to which the low priority current pointer is pointing). The monitor further includes a module 118 for receiving the status of the high priority next pointer (i.e. the queue identity (ID) to which the high priority next pointer 179 is pointing), a module 120 for receiving the status of the low priority next pointer 183 (i.e. the queue to which the low priority next pointer is pointing), a module 122 for receiving the state of each high priority queue status register (i.e. indicating whether each queue is empty or occupied), a module 124 for receiving the status of each low priority queue status register (i.e. indicating whether each low priority queue is empty or occupied), a module 126 for receiving the status of each high priority queue counter (i.e. the number of cells in each high priority queue), a module 128 for receiving the status of each low priority queue counter (i.e. indicating the number of cells in each low priority queue counter, i.e. indicating the number of cells in each low priority queue), and a module 130 for receiving the queue identity contained in outgoing cells. The monitor 107 further comprises a rule checker 132 which includes a set of rules 134 (which may have the form of a look-up table). The rule checker 132 can receive information from one or more modules, for example, concerning the status of one or more elements of the scheduler and queue identifications contained within incoming and outgoing cells, and compares this information against specific rules contained in the set of rules 134. The rule checker 132 may be adapted to output the result of the comparison for each rule tested, which may, for example, be provided to a user by any suitable means, for example, a visual display. In one embodiment, the rule checker may be adapted to output a result of the comparison only if a rule is violated or may be adapted to output the result of each test that is performed (i.e. whether the test is passed or failed). In embodiment, the monitor is adapted to control the timing of the detection of the status of each element or parameter. For example, the monitor may be adapted to request the status of a particular element of parameter each time the status is required.

The monitor may be implemented on a computer using any suitable programming language, for example, Specman, Specman Elite, Verilog or C, and is preferable implemented using an e-programming language. In one embodiment, the scheduler is implemented in a hardware description language, for example, Verilog or VHDL. In this case, the definitions of the information required from the scheduler may be contained within a file which is referenced in the HTL file of the scheduler. (The definitions file may be stored within the HDL file or separately elsewhere). If the monitor and scheduler are implemented using different programming languages, a programming language interface is required to enable the monitor to request the status of elements and parameters associated with the scheduler and to pass the request states and parameter values to the monitor.

Specific examples of aspects of a scheduler that may be monitored and checked by a scheduler monitor according to embodiments of the present invention will now be described with reference to FIGS. 3A and 3B.

Figure 3A:
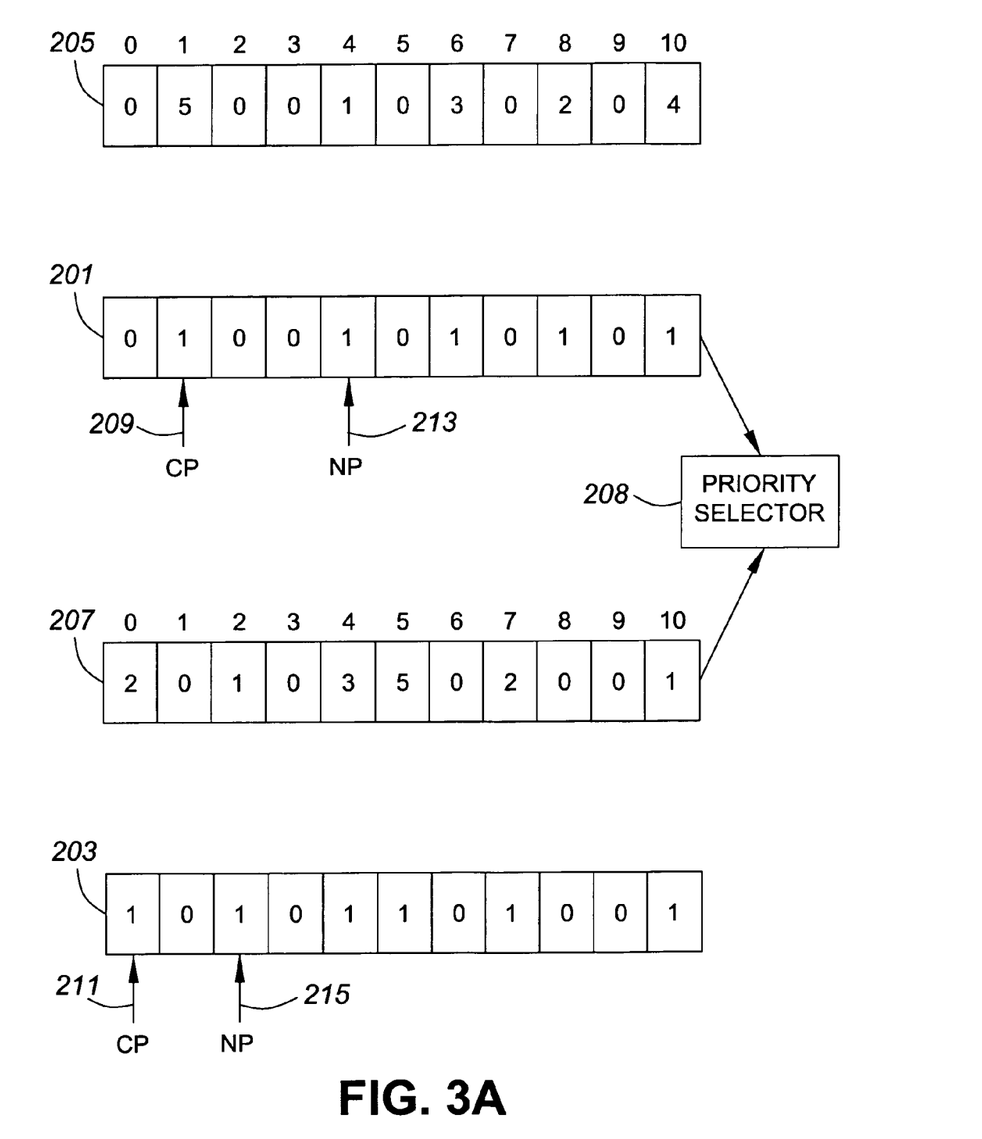
FIGS. 3A and 3B show an example of successive status of elements of a packet scheduler.

FIG. 3A shows an example of queue status registers 201, 203 of high and low priority groups of queues, respectively. Each register 201, 203 comprises a plurality of 1-bit registers corresponding to a particular queue, i.e. 0, 1, 2, 3, 4 . . . 10, where a 1 indicates that a queue is occupied and 0 indicates that a queue is empty. The scheduler also includes a first plurality of counters 205 for the high priority queues and a second plurality of counters 207 for the low priority queues. Each high priority queue has an associated counter which records and tracks the number of data cells in a high priority queue. Similarly, each low priority queue has an associated counter which records and tracks the number of data cells in a low priority queue.

A priority selector 208 is also provided for selecting the high or low priority queues for cell readout. FIG. 3A shows an example of a state for high and low priority queue registers 201, 203 and high and low priority queue counters 205, 207, at a particular instant of time. Each of the high and low priority queue registers indicate with a "1" those queues which are occupied and indicate with a "0" those queues which are empty. In addition, the high and low priority counters 205, 207 indicate the number of data cells present in each queue. Each of the high and low priority status registers has an associated current pointer 209, 211 which indicates the queue from which a data cell is to be read out, and a respective next pointer 213, 215 which indicates the next queue of each of the high and low priority queues from which a cell is to be read out after the cell has been read from the queue indicated by the current pointer 209, 211. In this example, the current pointer of the high priority queues is pointing to queue number 1 and the respective next pointer 213 is pointing to the next occupied queue, which in this example is queue number 4. The current pointer 211 of the low priority queues is pointing to the first occupied queue, which in this case is queue number 0 and the respective next pointer 215 is pointing to the next occupied queue, which is queue number 2.

In operation, depending on which of the high and low priority queues are selected, the scheduler will issue a departure request from either the high or low priority queue indicated by the respective current pointer 209, 211. The current pointer of the selected queue subsequently moves to the position indicated by its respective next pointer, and the next pointer moves to the next selected queue from which a data cell is to be read out. The next pointer may be moved to the next occupied queue, indicated by a 1 in the queue status register. For example, if the priority selector selects the high priority queues for cell readout, a data cell will be read from queue number 1, the current pointer 209 moves to the position of the next pointer, i.e. to the register for queue number 4 and the next pointer 213 moves to the register of the next occupied queue, i.e. queue number 6. Following a cell readout from queue number 1, the counter for that queue is decremented by 1. The status of high and low priority queue registers 201, 203 and queue counters 205, 207 following a cell readout from queue number 1 of the high priority queues is shown in FIG. 3B. As can be seen, the current pointer 209 of the high priority queues now points to the register for queue number 4 (which corresponds to the queue status register to which the next pointer 213 pointed in FIG. 3A), the next pointer 213 points to the status register for queue number 6 (i.e. the next occupied queue), and the counter for high priority queue number 1 has been reduced from 5 to 4. Since in the previous decision, the priority selector selected a high priority queue for cell readout, the current pointer and next pointer 211, 215 of the low priority queue status registers have not moved.

Figure 3B:
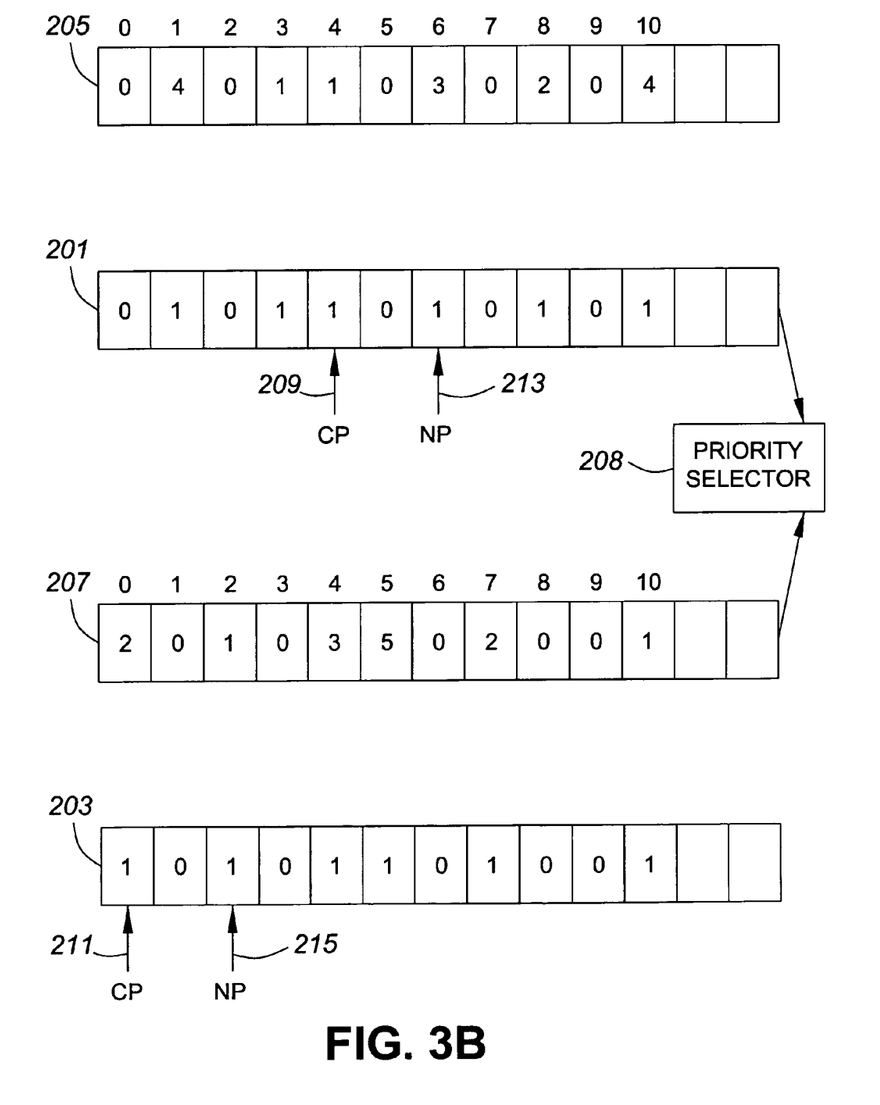

In the example of FIG. 3B, it can be seen that between a data cell being read from queue number 1 of the high priority queues and the current pointer 209 moving to the position of the next pointer 213, a data cell arrived in queue number 3. However, in this example, the scheduler is arranged such that the position of the next pointer determines the next position of the current pointer irrespective of a change of state of an intermediate queue before the current point moves to its next position, and therefore the arrival of a cell in queue number 3 does not effect the progression of the current pointer as determined by the next pointer.

For each decision made by the scheduler, certain elements of the scheduler have a certain state before a decision is executed, and change to another state after the decision is executed. For each scheduler state (i.e. either before or after a decision is made), the state of certain elements should relate to the state of other elements in a particular way, i.e. according to a particular relationship or one or more rules. Similarly, during the execution of a decision, the state of certain elements changes in a manner that may be predicted, again according to a particular relationship or rule. The monitor according to embodiments of the present invention checks that elements of the scheduler are functioning properly by, for example, checking or monitoring the status of two or more elements at a given time or changes in the status of the same element.

Current Pointer and Queue Register Status

In one example, the scheduler is intended to operate such that the current pointer and/or next pointer in each of the high and low priority queues only points to a queue status register indicating that a queue is occupied. In this embodiment, the scheduler is arranged to detect the current pointer position and the queue status register to which the current pointer is currently pointing. A register bit of 1 indicates that at this particular instant of time, the current pointer and queue status register is functioning properly. However, a register bit of 0, indicates that either one or both of the current pointer and queue status register is/are functioning incorrectly. The monitor may be adapted to run such a test repeatedly and thereby check the operation of both the current pointer and queue status registers for a number of decisions over a plurality of cycles.

Similarly, the scheduler may be adapted to operate such that the next pointer only points to a queue status register which indicates that a queue is occupied. In this case, the monitor may be adapted to monitor both the position of the next pointer and the state of the queue register to which it points to check that the register bit is 1 and not 0. Again, this test allows the monitor to quickly detect any problems associated with movement of the next pointer and its associated queue register, and that the monitor may be adapted to perform this test a number of times, for example for a plurality of successive decisions.

Counter Status and Current/Next Pointer Status and/or Queue Register Status

In another embodiment, the scheduler monitor may be adapted to monitor and check the status of a queue counter with one or more of the position of a current pointer, the position of a next pointer and a queue status as indicated by the queue status register. For example, according to scheduler operating rules, there should be an interdependence between the states of these elements. For example, if the value of a counter associated with a particular queue is zero, the status of its corresponding queue status register should also be zero, and if the value of a counter for a particular queue is greater than zero, the corresponding queue status register bit should be one. Similarly, for both current and next pointer positions, the corresponding counter value should be greater than zero if at least two queues are occupied. However, if only one queue is occupied, the queue to which the current pointer points should be occupied. The scheduler monitor may be adapted to monitor and test the state of any one of these elements to check whether or not the scheduler conforms with its intended operation, and therefore permits a fault to be diagnosed, and a faulty element to be readily identified.

Advantageously, the monitor may be adapted to monitor the state of two or more elements whose status exhibit at least some inter-dependence, so that a cross-check can be made between each element and at least two others to allow a faulty element to be identified more readily. It is to be noted that the above interrelationships between counter status, register status and current and next point position apply at the same instant of time (for example, a time slot as shown in FIG. 3A or 3B).

Alternatively, or additionally, the monitor may be adapted to compare the status of the same element in two different time slots. For example, where in one time slot, the counter status for the queue to which the current pointer points has a value of one, and the scheduler is expected to read out the only data cell from that queue, in a subsequent time slot, after cell readout, the counter for that queue should read zero, the queue status register for that queue should also read zero, and the current pointer should no longer point to that queue. The scheduler monitor may include rules defining these relationships, and may be arranged to detect the status of these elements in successive time frames to verify the performance of these elements.

Current Pointer/Next Pointer Position

In one embodiment, the scheduler may be arranged to monitor the relative positions between the current and next pointers. For example, each time a cell is read out from a selected queue, the current pointer which pointed to that queue should move to the position of the next pointer, so that the current pointer follows movement of the next pointer. The scheduler monitor may be adapted to check this operation by detecting the position of the next pointer in one time slot, detecting when a data cell is to be scheduled out from the group of queues associated with that next pointer, and detecting the position of the current pointer subsequent to cell read out from that group of queues. If the position of the current pointer matches the position of the detected next pointer, these elements are performing correctly. However, any mismatch between these two positions indicates a problem in the operation of at least one of these elements. A determination of which element is faulty may be facilitated by monitoring the status of one or more additional elements whose status is related to the position of the current and next pointers, and cross-checking the position of the current and next pointers with the status of that or those additional elements.

Priority Selector Status

An embodiment of a scheduler monitor may be adapted to detect and test the status of the priority selector which is responsible for selecting the particular group of queues (i.e. high or low priority) with the status of one or more elements. For example, any one or more of the current pointer position, next pointer position, queue status register and queue counter for one or each group of queues may be tested against the priority selector status. For example, when a decision is made to select a particular group of queues from which to read a cell, each of the positions of the current and next pointers, the value of the queue status register and the queue counter status should all change after the cell has been read out. The scheduler monitor may be arranged to make any one or more of these checks. At the same time, for the group of queues which were not selected, no change should take place in any of the positions of the current and next pointers and the values of the queue status registers and counters during the time a cell was read out from another group of queues. The scheduler monitor may include rules defining these relationships and may perform any one or more suitable tests to test these relationships and therefore the performance of these scheduler elements.

In another embodiment, the scheduler monitor may be adapted to monitor the status of the priority selector over a period of time to test its performance. For example, the priority selector may be designed to service each of a plurality of groups of queues for a predetermined proportion of time. The scheduler monitor may be arranged to detect the number of times each group of queues is selected for cell read out over a period of time and check this against a predetermined value for each group of queues. For example, the priority selector may be designed to select a high priority group of queues 90% of time and a low priority group of queues 10% of time. A scheduler monitor may be arranged to detect the priority selector status over a period of time and check that the ratio of the number of high priority selections to low priority selections is correct, in this example 9:1.

Scheduler Element Status and Output Cell

Another embodiment of a scheduler monitor may be adapted to monitor one or more cells output from the scheduler and, for example, detect from information contained within the cell, the identity of the queue of the input buffer from which the cell was read out. The status of one or more scheduler elements may also be monitored, for example, one or more elements from which the identity of the queue associated with a particular cell can be predicted. The scheduler monitor may be adapted to predict the queue from which a particular cell is to be read out based on the status of the element(s), and to compare the predicted queue with the queue identified in the cell.

In one implementation, test cells may be generated by a cell generator, each including a queue identifier (e.g. header) uniquely identifying one of the queues within the input buffer in which the cell should be placed. The scheduler monitor may detect each cell output from the scheduler, and detect from information within the cell the identity of the input buffer queue in which the cell was stored.

In one embodiment, the scheduler monitor detects and tracks successive positions of the current pointers in each group of queues of the input buffer. From this information, the scheduler monitor reads the sequence of queues from which successive data cells are expected at the output of the scheduler. The scheduler monitor may compare this expected sequence with the sequence of queues identified from the cells actually output from the scheduler. If the two sequences match, it may be determined that the scheduler is operating correctly. On the other hand, any mismatch between the two sequences indicates the problem in scheduler operation.

Advantageously, the above methodology is based on comparing one order of events with another, and therefore this test method does not need to cycle accurate. For example, the start of the cell readout sequence, as indicated by the current pointers, may be determined by detecting which of the high and low priority amount pointers moves first, or by detecting the initial status of the priority selector.

The start of the queue read out sequence as determined by the cells output from the scheduler is readily determined by detecting the first cell to be read out.

In other embodiments, the sequence of queues from which data cells are to be read out can be predicted by monitoring the status of other elements of the scheduler, for example, the sequence of positions of the next pointers for each group of input buffer queues, and/or the counters associated with each queue which decrease in value each time the cell is read out.

In any of the embodiments described above, the scheduler may be implemented as a simulated computer model of circuitry describing a scheduler, and may for example be described using RTL code. The scheduler monitor may be implemented using any suitable programming language and the monitor system may include a program language interface (PLI) to enable the monitor to detect the status and/or operations associated with elements of the scheduler module.

In one embodiment, the monitor may be implemented as a computer model and may be adapted to request the status of one or more elements of a simulated scheduler (for example, described in RTL code) by sending requests via a PLI. The PLI may be instructed to retrieve information concerning the status of one or more elements of the simulated scheduler by calling a file defining the PLI tasks. The PLI tasks may specify the particular elements of the scheduler simulator whose status is required for monitoring. For example, a suitable file may have the following form:

//Synopsys Translate OFF

'ifdef CHECK_SCHEDULER $pli_task(scheduler parameters . . . )

'endif

//Synopsys Translate ON

The scheduler parameter may include any one or more of the position of the next and current pointers, the status of one or more queue registers, the status of one or more queue counters, and the status of a priority selector.

In another embodiment, the monitor may be adapted to detect test cells input to the scheduler device and monitor the state of at least one element of the scheduler, and compare the detected status with an expected status based on the test cells supplied to the scheduler. For example, the monitor may be arranged to detect the status of the queue counters and/or queue status registers and to compare the status of these elements with an expected status for these elements, which may be predicted from information contained in each test cell identifying the queue in which the cell is to be stored.

In one embodiment of the present invention, the scheduler may be implemented and tested as a computer model using a language which enables the tested scheduler to be synthesized in hardware. In one implementation, the scheduler model may be tested and modified, as necessary, and a scheduler based on the tested model may then be sysnthesized in hardware using any suitable device fabrication techniques known to those skilled in the art.

Although a computer model of a scheduler is preferred for performance testing, in another embodiment, the schedule may be implemented in hardware with different internal elements being formed as separate modules (e.g. IC chips or discrete circuits) having exposed connections or wires to enable the states of internal elements of the scheduler to be monitored.

In any of the embodiments described above, the scheduler monitor may provide an indication to a user indicating the result of a test, the results of each of a plurality of tests and/or an indication of when the scheduler fails one or more tests.

Modifications to the embodiments described above will be apparent to those skilled in the art.

The invention claimed is:

1. A monitor for monitoring the operation of a scheduler for controlling the departure of data cells, comprising detection means for detecting a state of an element of said scheduler, comparing means for comparing the detected state with a predetermined state for said element and for outputting the result of the comparison;

wherein said scheduler comprises a computer generated model, and said monitor includes means for requesting said scheduler model to pass the status of said element to said monitor; and wherein said scheduler controls the departure of data from a plurality of queues, and said element comprises:

an element for recording whether a queue is empty or occupied, an element for recording the number of data cells contained in a queue, an element identifying a queue from which data is to be output, and an element identifying a group of queues from which data is to be output.

2. A monitor as claimed in claim 1, wherein said element for identifying a queue from which data is to be output comprises one of a current pointer for identifying a queue from which data is to be output, and a next pointer for identifying a queue from which data is to be output after data is output from the queue identified by said current pointer.

3. A monitor as claimed in claim 1, further comprising monitoring means for monitoring a parameter relating to the operation of said scheduler, and determining means for determining an expected state for said element based on said monitored parameter.

4. A monitor as claimed in claim 3, wherein said parameter comprises a state of a second element of said scheduler.

5. A monitor as claimed in claim 4, wherein said element comprises an element for identifying a queue from which a cell is to be output, and said parameter comprises one of:

the state of an element recording whether is queue is empty or occupied, the state of an element recording the number of cells contained in a queue, and an element indicating a group of queues from which a cell is to be output.

6. A monitor as claimed in claim 4, wherein said element comprises an element for recording whether a queue is empty or occupied, and said parameter comprises the status of an element recording the number of cells contained in a queue.

7. A monitor as claimed in claim 4, wherein said element comprises an element for recording whether a queue is empty or occupied, and said parameter comprises the status of a second element for recording whether the same queue is empty or occupied.

8. A monitor as claimed in claim 7, wherein said first element comprises a register for recording whether said is empty or occupied, and said second element comprises a counter for recording the number of data cells stored in said queue.

9. A monitor as claimed in claim 4, wherein said element comprises one of:

an element for recording whether a queue is empty or occupied, and an element for recording the number of cells contained in a queue, and said parameter comprises the status of an element identifying a group of queues from which a cell is to be output.

10. A monitor as claimed in claim 1, wherein said element for identifying a queue from which a cell is to be output, comprises one of:

a current pointer for identifying a queue from which a cell is to be output, and a next pointer identifying a queue from which a cell is to be output after a cell is output from the queue identified by said current pointer.

11. A monitor as claimed in claim 1, wherein said parameter comprises one of:

information contained in a cell supplied for storage in a queue identifying the queue in which the cell is to be stored, and information contained in a cell output by said scheduler identifying a queue for storing the cell.

12. A monitor as claimed in claim 1, wherein said detection means is detecting the status of said element before an operation causing a cell to be output, and said monitor further comprises prediction means for determining an expected status for said element after an operation causing a data cell to be output and wherein said detection means is further detecting the status of said element after said operation causing a data cell to be output, and wherein said comparison means is comparing the status of said element with the expected status of said element after said operation.

13. A monitor as claimed in claim 1, wherein said detection means is detecting the state of a second element prior to a next cell being output by said scheduler, and wherein said monitor further comprises prediction means for determining an expected state of said first element after the next cell readout by said scheduler and wherein said detection means is detecting the state of said first element after the next cell is output, and said comparison means is comparing the detected state with said expected state and output the result of the comparison.

14. A monitor as claimed in claim 13, wherein said second element comprises a current pointer which identifies a queue from which a data cell is to be readout and said first element comprises any one of:

an element recording whether a queue is empty or occupied, an element recording the number of cells in a queue, a next pointer identifying the next queue from which a data cell is to be output after the next cell output, and an element identifying a group of queues from which a cell is to be output.

15. A monitor as claimed in claim 13, wherein said second element comprises a next pointer identifying a queue from which a cell is to be output by said scheduler after the next cell output and said first element comprises any one of;

a current pointer identifying a queue from which the next cell is to be readout, an element recording whether a queue is empty or occupied, an element recording the number of cells contained in a queue and an element identifying a group of queues from which a cell is to be readout.

16. A monitor as claimed in claim 1, wherein said scheduler comprises a buffer having a plurality of queues for storing data cells, and a next pointer for identifying a queue from which a next cell is to be output, and wherein said first element comprises a current pointer which identifies a queue from which a data cell is to be read out, and said monitor is detecting the position of said current pointer after a data cell has been read from the queue identified by said current pointer and to compare said position with the position of said next pointer.

17. A monitor as claimed in claim 1, wherein said scheduler comprises first and second elements and said monitor is monitoring the state of at least one of said first and second elements at a plurality of different times and comparing the state of the element at said different times with an expected state at each of said plurality of different times.

18. A monitor for monitoring the operation of a scheduler for controlling the departure of data cells, comprising detection means for detecting a state of an element of said scheduler and a parameter relating to the operation of said scheduler, determining means for determining an expected value of said parameter based on the detected state of said element, and comparison means for comparing the detected parameter with said expected parameter and for outputting the result of the comparison;
    wherein said scheduler comprises a computer generated model, and said monitor includes means for requesting said scheduler model to pass the status of said element to said monitor.

19. A monitor as claimed in claim 18, wherein said parameter comprises one of:
    information contained in a cell supplied for storage in a queue identifying the queue in which the cell is to be stored, and information contained in a cell output by said scheduler identifying a queue for storing the cell.

20. A monitor as claimed in claim 19, wherein said element comprises any one of:
    an element for recording whether a queue is empty or occupied, an element for recording the number of data cells contained in a queue, an element identifying a queue, an element identifying a queue from which a data cell is to be output, and an element identifying a group of queues from which a data cell is to be output.

21. A monitor for monitoring a scheduler for controlling the departure of data cells from a plurality of queues, comprising means for detecting the state of an element of said scheduler at a plurality of different times and comparing the detected states with expected states for that element and for outputting the result of said comparison;
    wherein said scheduler comprises a computer generated model, and said monitor includes means for requesting said scheduler model to pass the status of said element to said monitor.

22. A monitor as claimed in claim 21, wherein said scheduler is selecting queues for cell departure from a plurality of different groups of queues, and said element comprises a selector for selecting a group of queues from said plurality of groups and whose status indicates the selected group.

23. A monitor as claimed in claim 22, wherein said detector is detecting the status of said selector over a predetermined period of time and said comparison means is comparing the number of times said selector selects a group of queues over said predetermined period with an expected value.

24. A system for monitoring operation of a scheduler for controlling the departure of data cells from a plurality of queues, comprising a generator for generating test cells and means for placing said test cells in said queues, each test cell containing the identity of the queue in which the cell is placed, and a monitor having means for detecting the state of at least one element of said scheduler whose state depends on which queue is selected by said scheduler for outputting a test cell and means for detecting from each test cell input to and/or output by said scheduler, the identity of the queue in which contained in said test cell, and comparison means for at least one of:
    comparing the detected element status with an expected status for said element based on the detected queue identity and comparing the detected queue identity, with an expected queue identity based on the detected status of said element.

25. A system as claimed in claim 24, wherein said element comprises one of a pointer identifying the queue from which a data cell is to be output and an element for recording whether a queue is empty or occupied.

26. A method of monitoring operation of a scheduler, comprising supplying said scheduler with data, monitoring the state of an element of said scheduler, comparing the monitored state with an expected state for said element, and outputting the result of the comparison;
    wherein said scheduler comprises a computer generated model; and
    wherein said scheduler is controlling the departure of data from a plurality of queues, and said element comprises:
    an element for recording whether a queue is empty or occupied, an element for recording the quantity of data contained in a queue, an element identifying a queue from which data is to be output, and an element identifying a group of queues from which data is to be output.

27. A method as claimed in claim 26, wherein said element for identifying a queue from which data is to be output comprises one of a current pointer for identifying a queue from which data is to be output, and a next pointer identifying a queue from which data is to be output after a data cell is output from the queue identified by said current pointer.

28. A method as claimed in claim 26, further comprising monitoring a parameter relating to the operation of said scheduler, determining an expected value for said parameter based on the state of said element, comparing the monitored value of said parameter with the expected value of said parameter and outputting the result of the comparison.

29. A method as claimed in claim 26, further comprising monitoring a parameter relating to the operation of said scheduler, and determining an expected state for said element based on said monitored parameter.

30. A method as claimed in claim 29, wherein said scheduler is controlling the departure of data cells from a plurality of queues, and said element comprises any one of:
    an element for recording whether a queue is empty or occupied, an element for recording the number of cells contained in a queue, an element identifying a queue from which a data cell is to be output, and an element identifying a group of queues from which a cell is to be output.

31. A method as claimed in claim 30, wherein said element for identifying a queue from which a cell is to be output comprises one of a current pointer for identifying a queue from which a cell is to be output, and a next pointer identifying a queue from which a cell is to be output after a cell is output from the queue identified by said current pointer.

32. A method as claimed in claim 30, wherein said parameter comprises one of:
    information contained in a cell supplied for storage in a queue identifying the queue in which the cell is to be stored, and information contained in a cell output from said scheduler identifying a queue for storing the cell.

33. A method as claimed in claim 29, wherein said element comprises an element for identifying a queue from which a cell is to be output, and said parameter comprises one of:
    the status of an element recording whether a queue is empty or occupied, the state of an element recording the number of cells contained in a queue, and an element indicating a group of queues from which a cell is to be output.

34. A method as claimed in claim 29, wherein said element comprises an element for recording whether a queue is empty or occupied and said parameter comprises the state of an element recording the number of cells contained in a queue.

35. A method as claimed in claim 29, wherein said element comprises one of:
an element for recording whether a queue is empty or occupied, and an element for recording the number of cells contained in a queue, and said parameter comprises the state of an element identifying a group of queues from which a cell is to be output.

36. A method as claimed in claim 29, further comprising monitoring the state of one or more elements of said scheduler and comparing the state of the or each further element with an expected state for the or each further element.

37. A method as claimed in claim 36, further comprising determining an expected state for the or each further element based on at least one of the monitored and the expected state of said first element.

38. A method as claimed in claim 37, wherein said one or more further elements is/are selected from the group consisting of:
an element for recording whether a queue is empty or occupied, an element for recording the number of cells contained in a queue, an element identifying a queue from which a cell is to be output, and an element identifying a group of queues from which a cell is to be output.

39. A method as claimed in claim 29, further comprising monitoring one or more further parameters relating to the operation of said scheduler and comparing the monitored value of the or each further parameter with an expected value for the or each parameter.

40. A method as claimed in claim 39, further comprising determining the expected value of the or each further parameter based on at least one of the monitored value and the expected value of the first parameter.

41. A method as claimed in claim 29, comprising monitoring said parameter at a plurality of successive times and comparing the sequence of monitored states of said parameter with a sequence of expected states for said parameter.

42. A method as claimed in claim 41, wherein each parameter comprises information contained in a data cell output by said scheduler identifying a queue for storing said cell.

43. A method as claimed in claim 26, wherein the step of monitoring the state of an element comprises calling an instruction associated with said scheduler model to pass the state of said element to said monitor.

44. A method as claimed in claim 26, wherein said computer generated model comprises a file containing a functional description of said element.

45. A method as claimed in claim 26, wherein said computer generated model is described in a programming language from which the scheduler can be synthesized.

46. A method as claimed in claim 45, wherein said scheduler model is generated using a hardware description programming language.

47. A method as claimed in claim 46, wherein said programming language comprises one of Verilog and VDHL.

48. A method as claimed in claim 26, further comprising determining the expected state for said element based on at least one previous state of said element or on at least one previous state of another element or parameter relating to the operation of said scheduler.

49. A method as claimed in claim 26, further comprising monitoring the state of said element at a plurality of successive times and comparing the sequence of monitored states with a sequence of expected states for said element.

* * * * *